Oct. 19, 1937.　　　　　H. W. GREEN　　　　2,096,636
LIFTING COUPLING FOR VEHICLES
Filed Jan. 26, 1937

H. W. Green,
INVENTOR

BY Victor J. Evans & Co.
ATTORNEY

Patented Oct. 19, 1937

2,096,636

UNITED STATES PATENT OFFICE 2,096,636

LIFTING COUPLING FOR VEHICLES

Herman W. Green, Pueblo, Colo.

Application January 26, 1937, Serial No. 122,433

3 Claims. (Cl. 280—150)

This invention relates to a lifting coupling for motor vehicles to aid a person in jacking a wheel of a vehicle from engagement with the ground, whereby manual effort will be materially reduced and less time will be required to complete the jacking operation. The present design of vehicle bodies is such that the placing of a hand jack in engagement with the axle is almost impossible and if accomplished the task is tiresome to the person and also requires the person to lie on the ground in order to position the jack in engagement with the axle. Therefore, it has become the practice of placing the jack in engagement with the frame of the vehicle or the bumper secured to said frame which requires an excessive amount of actuation of the jack before the wheel will leave the ground, due to the axle of the wheel being lifted by the frame through the vehicle spring. To eliminate the excessive actuation of the jack and to bring about the disengagement of the wheel from the ground by the initial upward movement of the frame my invention is adapted to the vehicle and forms a permanent part of the latter.

The primary object of this invention is the provision of a device which normally permits the axle and frame to move relative to each other during the usual action of the vehicle spring and which may be easily and quickly actuated to secure the frame to the axle so that the latter moves upwardly immediately with the upward movement of the frame, so that when lifting action is applied to the frame by the jack, the wheel of the axle disengages the ground with a minimum amount of elevating movement by the jack, consequently rendering the jacking up of a wheel comparatively easy by the person.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing my invention adapted to a motor vehicle with the invention in an inoperative position.

Figure 2:
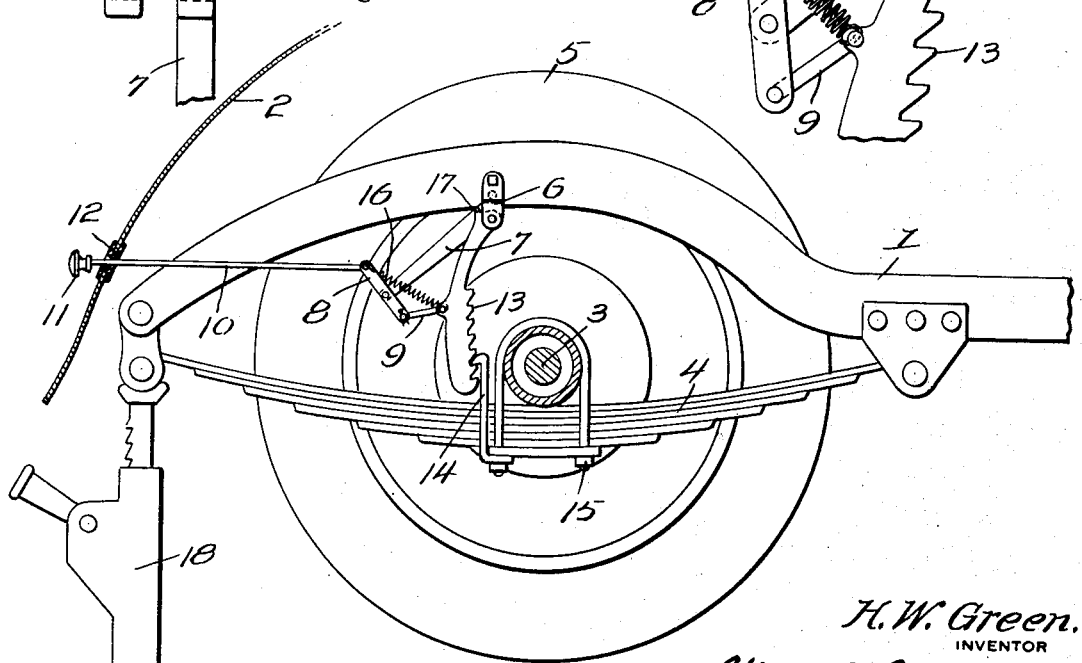
Figure 2 is a view similar to Figure 1 showing the invention in an operative position and with a jack in engagement with one of the spring shackles of the vehicle supporting the wheel of the vehicle in an elevated position.

Referring in detail to the drawing, the numeral 1 indicates the fragmentary portion of a motor vehicle frame, 2 a rear fender, 3 an axle connected to the frame by a vehicle spring 4 and 5 indicates the wheel carried by the axle 3. The fenders and body of the present day design of motor vehicle overhang or protrude such a distance from the axle 3 that the placing of a jack under the axle is extremely difficult. The present practice is to place the axle in engagement with the frame 1 or the spring shackle connected thereto, as shown in Figure 2, and in order to bring the wheel 5 into an elevated position, it is necessary to actuate the jack an excessive distance requiring a large amount of manual effort. To relieve this situation a plurality of devices constructed in accordance with the present invention are mounted on the frame of the vehicle and also connected with the axle in order that the axle may be secured directly to the frame for lifting the axle with the frame and thereby bring about quick and easy elevation of the wheel from the ground during the initial upward movement of the frame. As the devices are similarly constructed and similarly operated reference to one specifically is thought sufficient.

A bracket 6 is secured to the frame 1 above the axle and slightly laterally of the latter and has formed thereon a downwardly inclined arm 7 to which is pivoted a lever 8. The lever is pivoted intermediate its ends to the arm 7 and one end has pivoted thereto a link 9 while an operating rod 10 is pivotally connected to the other end of the lever. The operating rod extends through an opening in the fender 2 and is provided with a finger piece 11. A suitable cushion ferrule 12 is positioned in the opening to engage with the operating rod to prevent noise.

Figure 1:
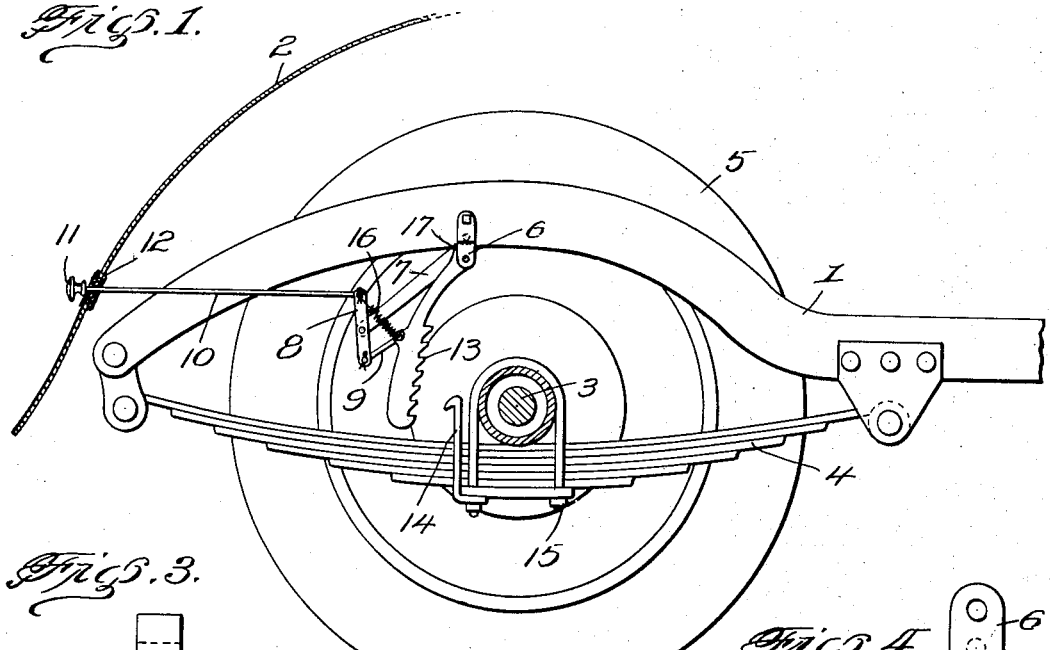
Figure 3:
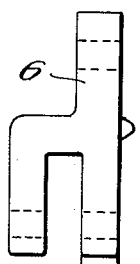
Figure 3 is a detail view showing a bracket forming a part of the present invention.
Figure 4:
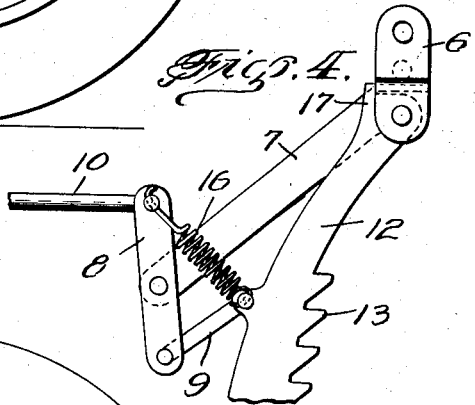
Figure 4 is a fragmentary side elevation illustrating a movable securing element forming part of the present invention and the means for imparting movement thereto.

One end of a holding lever 12 is pivoted to the bracket 6 and said lever 12 has a series of teeth 13 any one of which may engage with a hook-shaped element 14 secured to the axle 3 by the usual spring saddle 15. The link 9 is pivotally connected to the lever 12 and connected to the latter and to the lever 8 is a coil spring 16 acting to swing the holding lever 12 on its pivot away from the hook-shaped element 14. A lug 17 is formed on the pivoted end of the lever 12 and abuts the bracket 6 when said holding lever 12 is swung into an inoperative position by the action of the spring 16. To move the holding lever 12 in engagement with the hook-shaped element 14 the operator pulls upon the finger piece 11, rocking the lever 8 on its pivot and said lever 8 in turn swings the holding lever 12 until a tooth thereof engages with the hook-shaped element 14. The operator holds the finger piece in a rearward direction until the jack 18 has acted upon the frame to elevate the latter. The operator then may release the finger piece 11 and the holding lever 12 remains in engagement with the hook-shaped element 14 due to the weight of the axle and wheel thereon. With the frame secured to the axle in the manner described it only requires a limited movement of the jacking head in an upward direction before the wheel becomes disengaged from the ground. After the wheel has been lowered into engagement with the ground and the jack 18 removed, the person may step upon the vehicle so that the weight of the person will cause a downward movement of the frame sufficient to disengage the holding lever 12 from the hook-shaped element 14. As soon as the holding lever 12 disengages from the hook-shaped element 14 the spring returns it to an inoperative position, as shown in Figure 1.

What is claimed is:

1. In combination with a motor vehicle frame and an axle connected to the frame by a spring, a bracket secured to the frame, a hook-shaped element secured to the axle, a holding lever pivoted to said bracket to engage with the hook-shaped element for securing the frame to the axle to bring about upward movement of the axle with the frame when the latter is elevated by a jack, an arm formed on said bracket, an operating lever pivoted to said arm and having one end pivotally connected to the holding lever, and an operating rod connected to the other end of the operating lever.

2. In combination with a motor vehicle frame and an axle connected to the frame by a spring, a bracket secured to the frame, a hook-shaped element secured to the axle, a holding lever pivoted to said bracket to engage with the hook-shaped element for securing the frame to the axle to bring about upward movement of the axle with the frame when the latter is elevated by a jack, an arm formed on said bracket, an operating lever pivoted to said arm and having one end pivotally connected to the holding lever, an operating rod connected to the other end of the operating lever, and a spring connecting the operating lever to the holding lever whereby said holding lever will be supported normally disengaged from the hook-shaped element.

3. In combination with a motor vehicle frame and an axle connected to the frame by a spring, a bracket secured to the frame, a hook-shaped element secured to the axle, a holding lever pivoted to said bracket to engage with the hook-shaped element for securing the frame to the axle to bring about upward movement of the axle with the frame when the latter is elevated by a jack, an arm formed on said bracket, an operating lever pivoted to said arm and having one end pivotally connected to the holding lever, an operating rod connected to the other end of the operating lever, a spring connecting the operating lever to the holding lever whereby said holding lever will be supported normally disengaged from the hook-shaped element, an extension formed on the pivoted end of the holding lever to abut the bracket for limiting the movement of the holding lever under the action of the said second-named spring.

HERMAN W. GREEN.